…

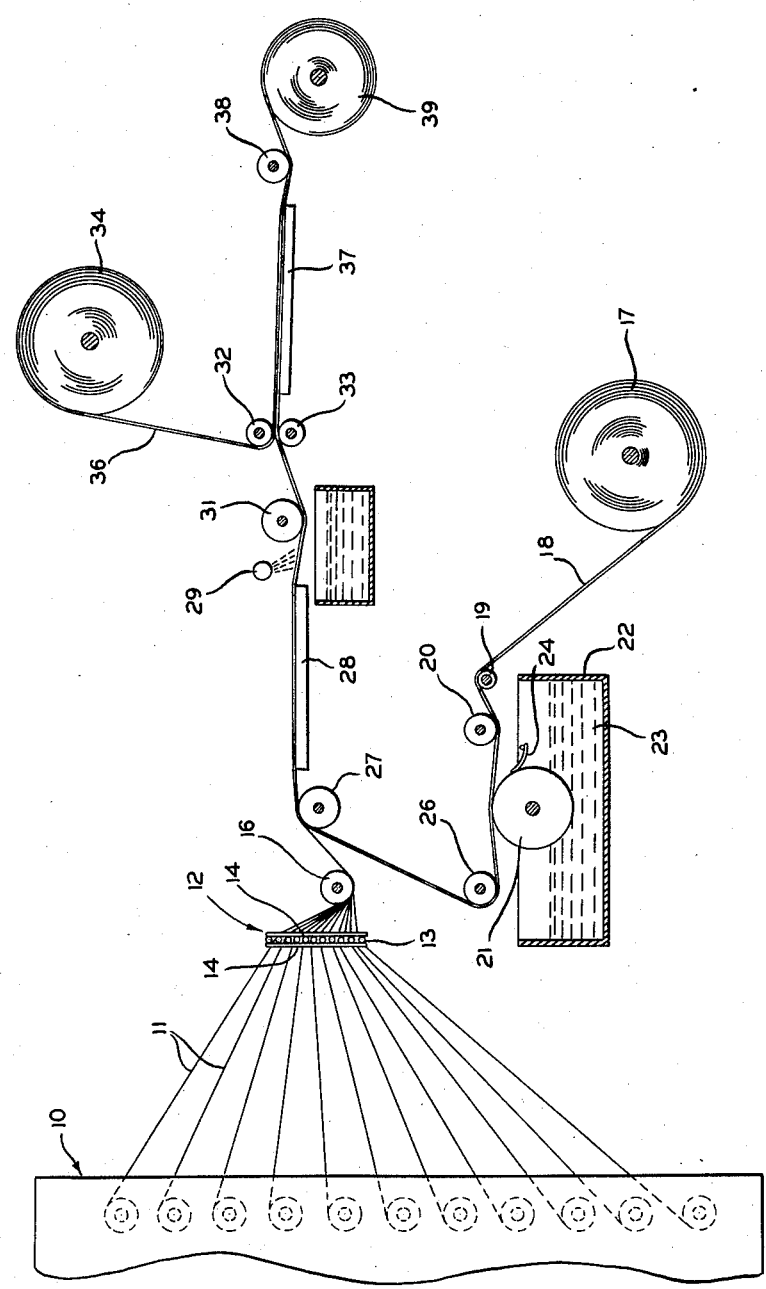

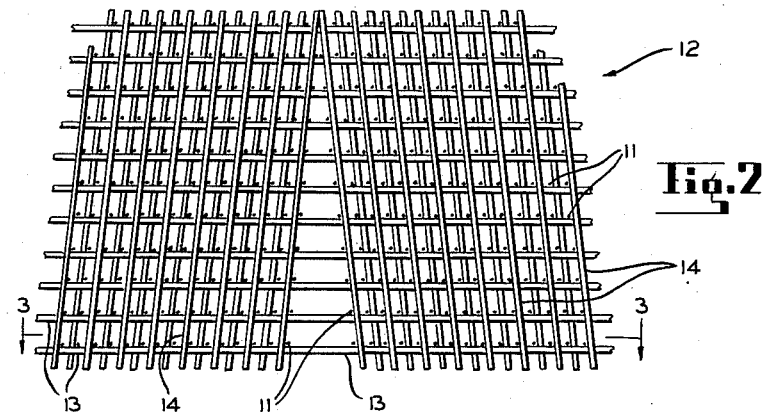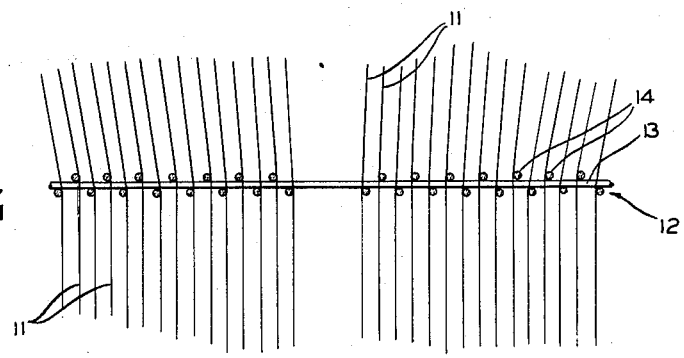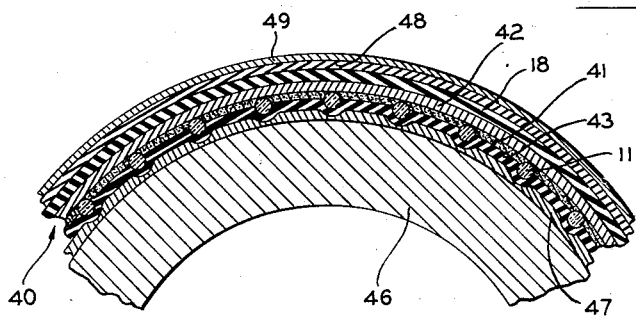

United States Patent Office 2,897,841
Patented Aug. 4, 1959

2,897,841

INSULATED PIPE, REINFORCED LAMINATED SHEET MATERIAL AND METHOD OF MAKING THE SHEET MATERIAL

In Wai Hui and Samuel Kruty, Chicago, Ill., assignors to Dearborn Chemical Company, Chicago, Ill., a corporation of Illinois Application May 2, 1955, Serial No. 505,211

14 Claims. (Cl. 138—64)

The present invention is directed to an improved reinforced laminated sheet material which combines adequate tensile strength and adequate bursting strength with excellent flexibility and light weight.

The laminated sheet material of the present invention has general applicability as a wrapping material for any use where a light weight, flexible, strong, vapor impermeable sheet is required. The sheet material of the present invention has particular applicability to the field of coating pipe lines for the purpose of preventing excessive heat loss, preventing condensation, and retarding corrosion of the pipe line.

A satisfactory pipe line coating material must possess several distinct, and to some extent at least, conflicting properties. In order that the coating material conform accurately to the surface of the pipe, the wrapping must be extremely flexible. At the same time, it must be sufficiently strong to resist the stresses which it undergoes during use. Furthermore, it must be capable of being bonded reasonably well to metallic surfaces in order to prevent slipping of the wrapping material from about the surface of the pipe. It would be also very highly desirable to provide wrapping material with a high dielectric strength in order to reduce the possibility of electrical break-down across the wrapper.

Accordingly, an object of the present invention is to provide an improved wrapper material having excellent tensile strength and bursting strength even though relatively light in weight.

Another object of the present invention is to provide a wrapping material particularly adapted to wrapping pipe lines and similar structures.

Still another object of the invention is to provide an improved wrapping material in which reinforcing strands are locked in the laminate in a highly improved manner.

A further object of the invention is to provide a method for the continuous production of a reinforced laminated sheet material.

Another object of the invention is to provide an improved method for anchoring reinforcing strands within a laminated construction including synthetic resin films.

In the wrapper of the present invention, a thin, flexible sheet material, preferably consisting of a thin film of a cellulose derivative, is reinforced by the addition of reinforcing strands running lengthwise of the sheet, and secured thereto by means of a suitable resinous adhesive. The reinforcing strands are preferably strands of glass fiber. Strands of this type are difficult to secure to ordinary plastic film materials, and for this reason, a separate anchoring stratum is employed to hold these glass strands in position. Specifically, a layer of microcrystalline wax is interposed between the strands which have become imbedded in the adhesive and an overlying top sheet of a thermoplastic film. The microcrystalline wax has an affinity for the thermoplastic film, and also has the property of securely bonding the glass fibers so that the resulting laminate is strong and flexible but has the reinforcing strands permanently locked in their original orientation within the laminate.

A further description of the present invention will be made in conjunction with the attached sheets of drawings which, by way of preferred embodiment, illustrate the features of the present invention.

In the drawings:

Figure 1 is a somewhat diagrammatic view of an apparatus for forming the laminated sheet material of the present invention;

Figure 2 is a fragmentary front elevational view of the guide mechanism employed;

Figure 3 is a plan view of the guide mechanism taken substantially along the line 3—3 of Figure 2;

Figure 4 is a greatly magnified, fragmentary cross-sectional view taken across the web of the sheet material illustrating the structure thereof; and Figure 5 is a cross-sectional view of a pipe having applied thereto a laminated sheet material according to the present invention.

In Figure 1, reference numeral 10 indicates generally a creel on which is supported a plurality of bobbins of the reinforcing material. Preferably, the reinforcing material consists of strands of twisted glass fibers having a diameter of about .0035 inch, although they may be larger. The reinforcing strands 11 are fed through a thread guiding mechanism, generally indicated at numeral 12 in the drawings where they pass through a frame work consisting of horizontally disposed guide rods 13 and a plurality of vertically disposed guide rods 14. Preferably, the guide rods are each composed of glass to minimize the chafing of the threads as they are fed to the machine. In a commercial embodiment of this feeding mechanism, we employed eleven horizontal rods of ¼ inch diameter spaced ⅜ of an inch apart, center-to-center, and sixty-four vertical rods staggered in two rows. The vertical rods were inclined 3½ degrees toward the the center line in parallel relationship on both sides of the center. This type of structure is illustrated in Figures 2 and 3 of the drawings.

The number of threads per inch of web can be varied by tilting the thread guiding mechanism 12, the spacing between the individual threads decreasing as the guiding mechanism 12 is swung into a more nearly horizontal position. For the purposes of manufacturing a pipe wrapping material, we prefer to use a thread lay of about 40 threads per inch of width of the web.

The threads passing through the guiding mechanism 12 are gathered into a single plane along the surface of a roll 16 from which they are applied to the web.

The base web is fed continuously from a master roll 17, and is preferably a cellulose derivative such as cellulose acetate, regenerated cellulose, or a mixed cellulose ester such as cellulose acetate-butyrate.

Because of the very substantial strengthening effect afforded by the presence of the reinforcing strands, the base web 18 fed from the master roll 17 may be extremely thin. Specifically, we prefer to use a base web having a thickness in the range from about 0.0007 to 0.002 inch, or greater, with a thickness of 0.00088 being particularly preferred.

The web 18 passes over a tensioning roller 19 and then under a guide roll 20 before passing over the surface of an applicator roll 21. The latter is partially immersed in a tank 22 containing a liquid adhesive 23 which is compatible with the material of the web 18. Materials such as polyvinyl acetate, polyvinyl acetate-chloride copolymers, and polyamide adhesives are suitable. A plurality of doctor blades 24 smooth out the film of adhesive picked up by the applicator roll 21 from the bath 23.

The adhesive covered web then passes about the periphery of a guide roll 26 and over a laminating roll 27 where the glass fiber strands 11 are laid on the freshly coated web and are adhered thereto by the natural tackiness of the adhesive. The strand covered web is then passed over a steam heated, flat plate adhesive dryer 28 of sufficient length so that in passing over the dryer 28, the adhesive loses its original tackiness by volatilization of the solvent and becomes set.

Shortly after leaving the dryer 28, the strand covered surface of the web is subjected to a stream of molten wax from a wax spraying head 29. Preferably, the wax composition consists of a microcrystalline wax having a melting range of from about 140 to 185° F. The wax coated web, is passed under a metering roll 31 and then between a pair of laminating rolls 32 and 33 while the wax is still in a fluid condition. A master roll 34 supplies a thin thermoplastic web 36 to the nip between the laminating rolls 32 and 33 over the still mobile wax coating. In passing through the laminating rolls 32 and 33, the excess wax, if any, is squeezed out of the laminate and may be recovered.

The microcrystalline wax serves the important function of providing a buffer between the surface of the reinforcing strands 11 and the thermoplastic film 36 which is to be laminated thereto. It also has the function of providing adequate resistance to vapor permeability. The intermediate wax layer thus provides a means for anchoring the exposed portions of the reinforcing strands 11 (see Figure 4) without unduly increasing the bulk or the rigidity of the laminated product. As a general rule, the wrapper should retain at least about one-half pound of wax per square yard of the product.

The thermoplastic film 36 is preferably a film of polyethylene which has excellent vapor permeability resistance although other thermoplastic films such as polyvinylidene chloride, polyvinyl chloride, or the like may also be employed but not necessarily with equivalent results. Generally, the thickness of the thermoplastic film will be at least 1.5 mils and may be as high as five mils or more.

As the laminated product passes through the laminating rolls 32 and 33, it passes over a water cooled, flat plate cooler 37 which serves to solidify the fluid microcrystalline wax, and finally the finished laminated product passes over a guide roll 38 to be wound up on a roll 39.

The finished structure of the laminate is best seen in the greatly magnified view of Figure 4. It will be observed that the base film 18 composed of the cellulose derivative has a thin coating of the adhesive 41 which serves to anchor partially the spaced reinforcing strands 11. Surrounding the strands 11 and bonded to the adhesive film 41 is a layer 42 of a microcrystalline wax. The upper surface of the laminate comprises the thermoplastic film 43.

The physical characteristics of the laminated product make it ideally suited for use as a pipe wrapping material. For example, a typical sample of the material produced according to the present invention has a thickness of 10.3 mils., a tensile strength in the machine direction of about 112 lbs. per inch, and a vapor permeability of less than 0.470 gram/100 sq. in./24 hrs. at 95% relative humidity at 100° F. The laminated product had a weight of only 0.4159 lb. per square yard but had a bursting strength of 86.8 lbs. per square inch. The dielectric strength of the material in a dry condition was 6.5 kv., while after immersion of 24 hours in water, the dielectric strength decreased to 2.5 kv. In contrast, a typical pipe wrapping material of the past weighing more than three times as much per unit area as our improved product had a tensile strength of only 44.3 lbs. per inch in the machine direction, a bursting strength of 51 lbs. per square inch, and, after immersion for 24 hours in water, had a dielectric strength too low for measurement.

Another of the excellent features of the wrapper of the present invention is the fact that the surfaces do not block when the laminated product is wound tightly upon rolls. Pipe wrapping materials of the past, particularly those which contained asphalt and similar compositions, presented a distinct problem of tackiness which frequently caused blocking in the rolls.

When the laminated sheet material of the present invention is employed as a pipe wrapping material, it may be combined with the pipe in the manner shown in Figure 5. As seen in that figure, a pipe 46 is first given a coating of wax such as a microcrystalline wax coating 47, the wax being applied in the molten state. Immediately after the application of the wax, the wrapper is wound in a spiral manner around the pipe to bond the wrapper to the wax. For best results, it is best to position the thermoplastic film 43 next to the undercoating of wax, as otherwise the bituminous service coat subsequently applied may damage the heat sensitive thermoplastic film. Subsequently, the exterior of the coating, constituting the base film 18 may be given a hot service coat 48 of a combination of wax and asphalt. Finally, a layer of kraft paper 49 may be wound spirally about the service coat 48.

It is not essential that the wrapper be applied to a precoated pipe, or that a service coat be employed on the exterior of the wrapper. For example, a suitable adhesive can be coated on the one surface of the laminated product which may be in the form of a tape. The wrapper is then applied as simply as wrapping a piece of adhesive tape about the pipe.

While much of the foregoing discussion has dealt with the particular applicability of the laminated wrapper in the field of pipe coverings, it should be appreciated that the strong, flexible, light sheet material of the present invention lends itself to other fields, such as wrapping and the like.

It will be evident that various modifications can be made to the described embodiment without departing from the scope of the present invention.

We claim as our invention:

1. A laminated sheet material comprising a thin base sheet of a cellulose derivative, a plurality of unconnected reinforcing strands adhesively secured to said base sheet, a thermoplastic film overlying said base sheet, and a layer of microcrystalline wax interposed between said strands and said thermoplastic film bonding said film to said strands.

2. A laminated sheet material comprising a thin base sheet of cellulose acetate, a plurality of unconnected reinforcing strands adhesively secured to said base sheet, a thermoplastic film overlying said base sheet, and a layer of microcrystalline wax interposed between said strands and said thermoplastic film bonding said film to said strands.

3. A laminated sheet material comprising a base sheet of a cellulose derivative having a thickness of from 0.0007 to 0.002 inch, a plurality of unconnected glass fiber strands adhesively secured to said base sheet, a thermoplastic film overlying said base sheet, and a layer of microcrystalline wax interposed between said strands and said thermoplastic film bonding said film to said strands.

4. A laminated sheet material comprising a base sheet of a cellulose derivative having a thickness of from 0.0007 to 0.002 inch, a plurality of unconnected glass fiber strands adhesively secured to said base sheet, a polyethylene film overlying said base sheet, and a layer of microcrystalline wax interposed between said strands and said thermoplastic film bonding said film to said strands.

5. A laminated sheet material comprising a base sheet of a cellulose derivative having a thickness of from 0.0007 to 0.002 inch, a plurality of unconnected glass fiber strands adhesively secured to said base sheet, a thermoplastic film overlying said base sheet, and a layer of microcrystalline wax interposed between said strands and said thermoplastic film bonding said film to said strands, said wax layer being present in an amount of at least one-half pound per square yard of said laminated sheet.

6. A laminated sheet material comprising a base sheet of a cellulose acetate having a thickness of from 0.0007 to 0.002 inch, a plurality of unconnected glass fiber strands adhesively secured to said base sheet, a polyethylene film overlying said base sheet, and a layer of microcrystalline wax interposed between said strands and said thermoplastic film bonding said film to said strands.

7. A laminated sheet material comprising a base sheet of a cellulose derivative measuring from 0.0007 to 0.002 inch in thickness, a plurality of unconnected glass fiber strands adhesively secured to said base sheet, a thermoplastic film having a thickness of from 1.5 to 5 mils overlying said strands, and a layer of microcrystalline wax interposed between said strands and said thermoplastic film bonding said film to said strands.

8. A laminated sheet material comprising a base sheet of a cellulose derivative measuring from 0.0007 to 0.002 inch in thickness, a plurality of unconnected glass fiber strands adhesively secured to said base sheet, a thermoplastic film having a thickness of from 1.5 to 5 mils overlying said strands, and a layer of microcrystalline wax interposed between said strands and said thermoplastic film bonding said film to said strands, said wax being present in an amount of at least one-half pound per square yard of said laminated sheet material.

9. The method of making laminated sheet material which comprises applying a coating of adhesive onto a thin moving web of a cellulose derivative, continuously laying a plurality of reinforcing strands lengthwise of the adhesive coated web, spraying a film of molten microcrystalline wax onto the moving web over said strands, applying a thermoplastic film over and in contact with the strands while the wax is still fluid, and thereafter cooling the resulting laminate to cause said thermoplastic film to be tightly bonded to said strands.

10. In a method of laminating in which reinforcing strands are applied to an adhesive coated web and a thermoplastic film is laid on the strands, the steps comprising spraying a molten microcrystalline wax composition over said strands and pressing said film over the applied wax while said wax is still in a fluid condition.

11. A method of making laminated sheet material which comprises feeding a plurality of reinforcing glass fiber strands through a guide means including a network of glass rods, gathering said strands into a single plane at a point beyond said guide means, depositing said strands onto a moving adhesive covered cellulose web, applying a film of molten microcrystalline wax onto the moving web over said strands, and applying a thermoplastic film over and in contact with the strands while the wax is still fluid.

12. An insulated pipe structure comprising a pipe having wrapped therearound, a covering comprising a base web of a cellulose derivative, a plurality of glass fiber strands adhesively secured to said base web, a film of microcrystalline wax covering said strands and extending between said strands, and a thermoplastic film bonded to said film of microcrystalline wax.

13. An insulated pipe structure comprising a pipe having a coating of wax thereon, a wrapping secured to said wax and comprising a base web of a cellulose derivative, a plurality of glass fiber strands adhesively secured to said base web, a film of microcrystalline wax covering said strands and extending between said strands, and a thermoplastic film bonded to said film of microcrystalline wax.

14. An insulated pipe structure comprising a pipe having a coating of wax thereon, a wrapping secured to said wax and comprising a base web of a cellulose derivative, a plurality of glass fiber strands adhesively secured to said base web, a film of microcrystalline wax covering said strands and extending between said strands, and a thermoplastic film bonded to said film of microcrystalline wax, and a bituminous coating over said wrapping.

References Cited in the file of this patent

UNITED STATES PATENTS

| | | |
|---|---|---|
| 1,895,022 | Chandler | Jan. 24, 1933 |
| 1,974,594 | Angier | Sept. 25, 1934 |
| 2,016,039 | Hurrell | Oct. 1, 1935 |
| 2,281,635 | Strauss | May 5, 1942 |
| 2,311,572 | Reynolds | Feb. 16, 1943 |
| 2,311,573 | Shoan | Feb. 16, 1943 |
| 2,513,708 | Belcher | July 4, 1950 |
| 2,552,599 | Stout | May 15, 1951 |
| 2,561,781 | Bruce | July 24, 1951 |
| 2,575,666 | Knudson | Nov. 20, 1951 |
| 2,631,957 | Francis | Mar. 17, 1953 |
| 2,708,177 | Fries et al. | May 10, 1955 |
| 2,713,551 | Kennedy | July 19, 1955 |